July 4, 1950 — V. H. GRAY — 2,513,641
CURVE SCRIBING INSTRUMENT
Filed Dec. 19, 1945 — 3 Sheets-Sheet 1

INVENTOR.
Vernon H. Gray
BY
Evans + McCoy
ATTORNEYS

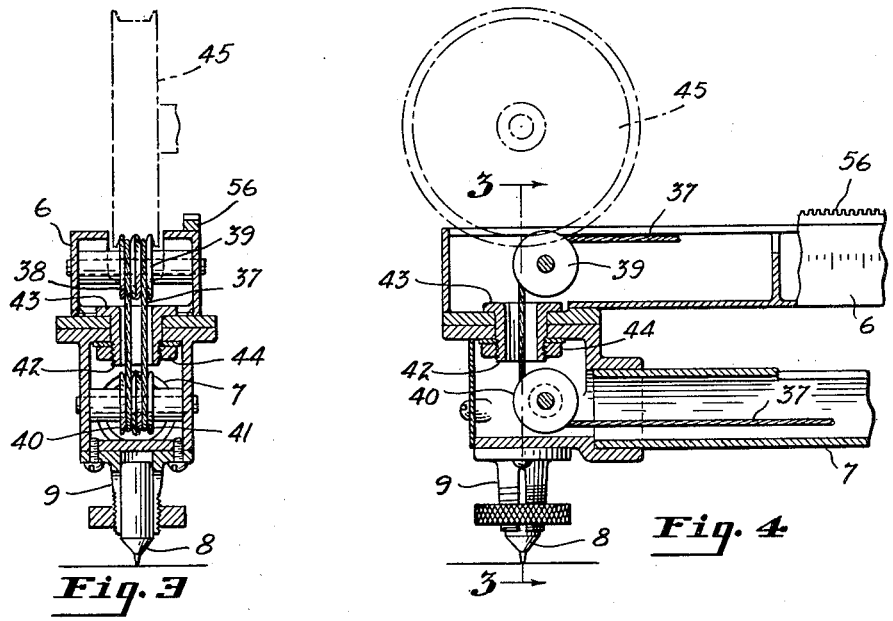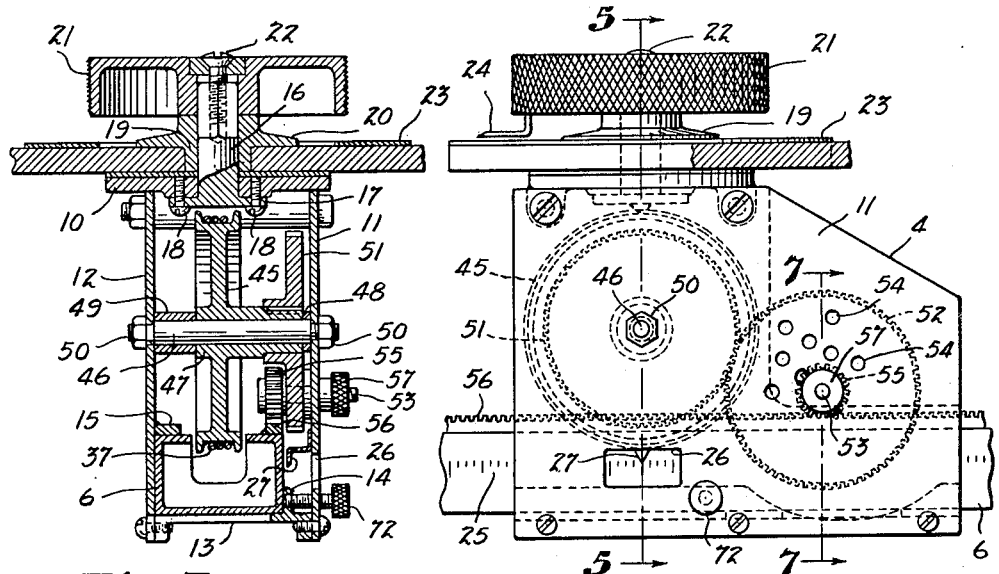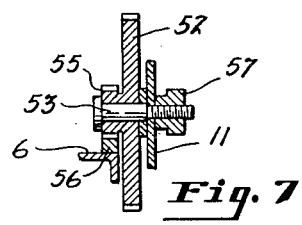

July 4, 1950   V. H. GRAY   2,513,641
CURVE SCRIBING INSTRUMENT
Filed Dec. 19, 1945   3 Sheets-Sheet 3
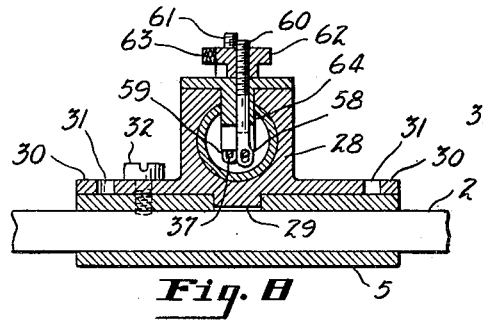
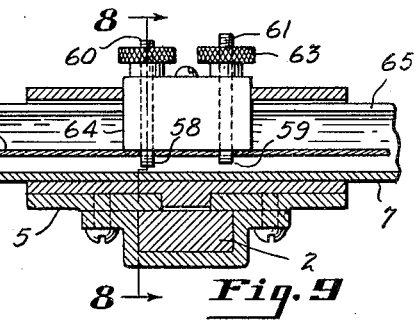
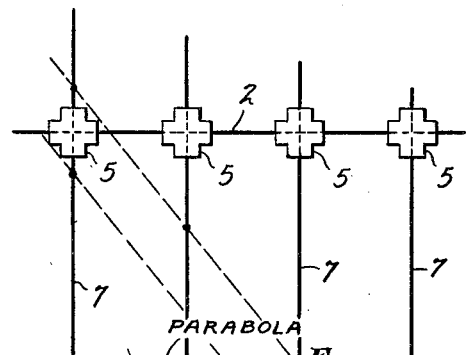
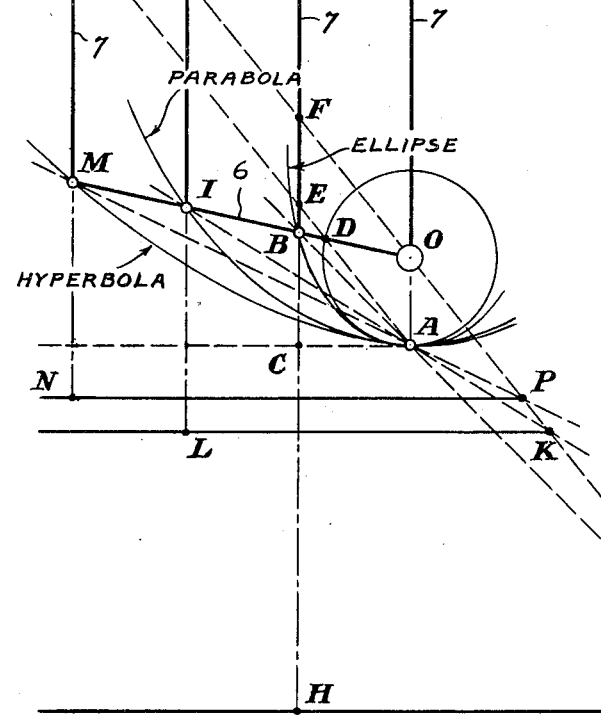
INVENTOR.
Vernon H. Gray
BY
Evans + McCoy
ATTORNEYS Patented July 4, 1950

2,513,641

UNITED STATES PATENT OFFICE 2,513,641

CURVE SCRIBING INSTRUMENT

Vernon H. Gray, Cleveland, Ohio

Application December 19, 1945, Serial No. 635,887

19 Claims. (Cl. 33—27)

This invention relates to an instrument for scribing curves and more particularly to an instrument that is designed to scribe conic sections.

It is an object of the invention to provide an instrument which may be adjusted to scribe any one of the conic sections, namely, a circle, an ellipse, a parabola or an hyperbola.

A further object of the invention is to provide an instrument that may be adjusted not only to vary the eccentricity of the curve scribed, but also to vary the focal length of the curve.

A further object of the invention is to provide an instrument provided with change gearing for effecting changes in eccentricity of the curve scribed and that is capable of adjustment to vary eccentricity independently of the gearing, so that curves of any eccentricity intermediate those provided by the change gearing may be scribed.

With the above and other objects in view, the invention may be said to comprise the instrument as illustrated in the accompanying drawings hereinafter described and particularly set forth in the appended claims, together with such variations and modifications thereof as will be apparent to one skilled in the art to which the invention pertains.

Reference should be had to the accompanying drawings forming a part of this specification, in which:

Fig. 3 is a vertical section taken on the line indicated at 3—3 in Fig. 4;

Fig. 4 is a vertical section taken on the line indicated at 4—4 in Fig. 1;

Fig. 5 is a vertical section taken on the line indicated at 5—5 in Fig. 6;

Fig. 6 is a side elevation of the rotatable support viewed as indicated at 6—6 in Fig. 1;

Fig. 7 is a section taken on the line indicated at 7—7 in Fig. 6;

Fig. 8 is a section taken on the line indicated at 8—8 in Fig. 9;

Fig. 9 is a section taken on the line indicated at 9—9 in Fig. 1;

Fig. 10 is a section taken on the line indicated at 10—10 in Fig. 1;

Fig. 11 is a section taken on the line indicated at 11—11 in Fig. 10, and

Fig. 12 is a diagrammatic view illustrating the principle of the invention.

Figure 1:
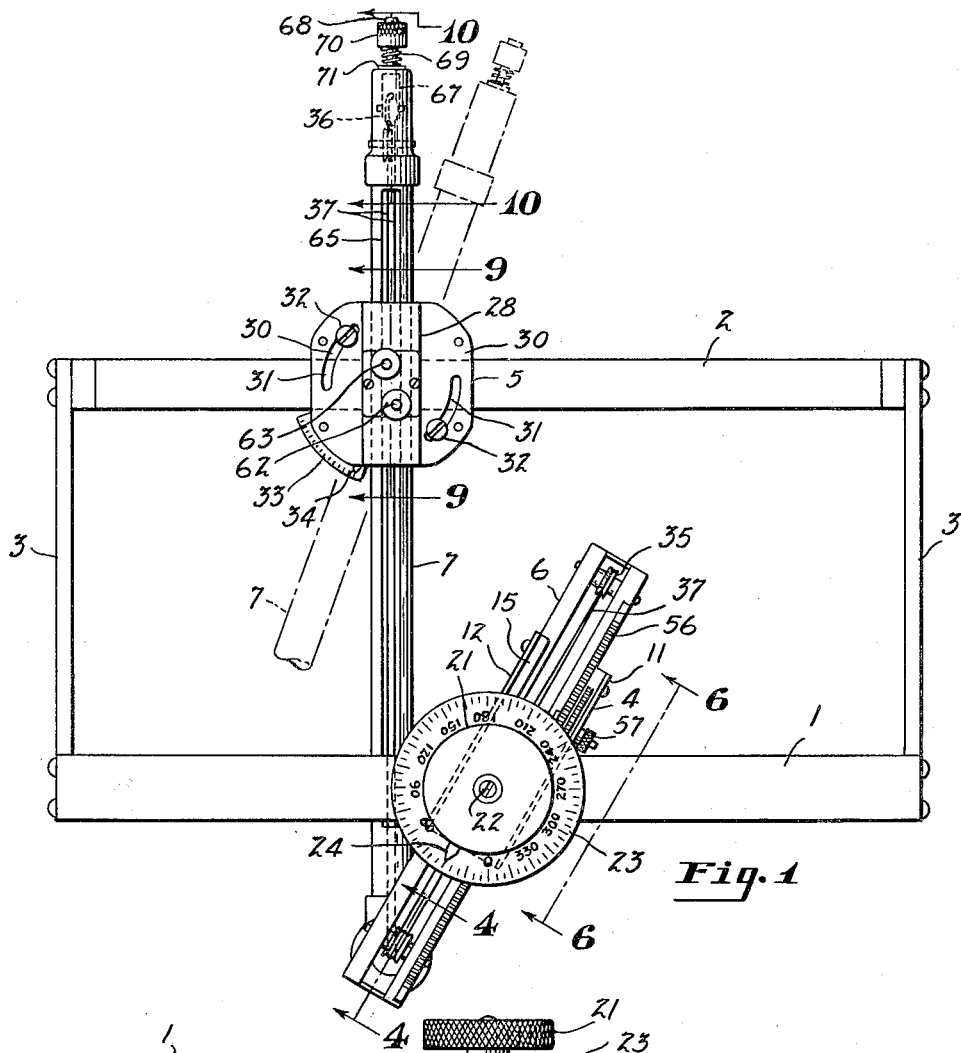
Figure 1 is a top plan view of an instrument involving the invention.
Figure 2:
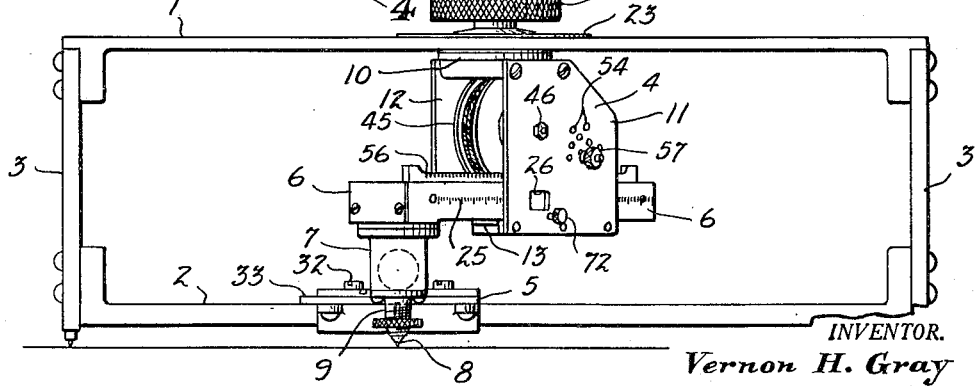
Fig. 2 is a front elevation of the instrument shown in Fig. 1.

In the accompanying drawings an embodiment of the invention is shown in which the instrument has a supporting frame consisting of an elongated front bar 1, a rear bar 2 parallel to the bar 1, and end bars 3 connecting the front and rear bars. A rotatable support 4 is mounted upon the bar 1, preferably substantially midway between the ends thereof and a support 5 is mounted to slide longitudinally on the bar 2. A slide in the form of a bar 6 is mounted for endwise movement on the rotatable support 4 and a slide in the form of a bar 7 is mounted for endwise movement on the support 5. The bar 2 is positioned at a lower level than the bar 1 and the slide bar 7 which is disposed transversely to the bar 2 is positioned below the bar 6 upon the support 4 and is pivotally connected at one end to the bar 6.

A scribing point 8 is mounted in a holder 9 attached to the bar 7. The scribing point may be a marking, cutting or gauging implement, and mounted to travel over a flat surface or to follow a curved surface being cut or gauged. The two slide bars 6 and 7 and their supports are so interconnected that a turning movement of the support 4 causes the support 5 to travel longitudinally of the bar 2 and the bars 6 and 7 to slide on their supports in such manner that a fixed predetermined ratio is maintained between linear movements of the slide bars 6 and 7 on their supports.

The principle of the invention is illustrated in Fig. 12 of the drawings in which the point O indicates the axis of rotation of the support 4 which carries the slide 6 and the lines designated 2, 6 and 7 represent the bars 2, 6 and 7. With the support 4 in a position to superimpose the slide bar 6 directly over the slide bar 7, the point A indicates a point to which the scribing point 8 may be adjusted. If the support 4 be turned about the axis O and the slide bars 6 and 7 be so connected to one another and to the supports that one imparts a linear movement to the other in such manner that a fixed predetermined ratio is maintained between the linear movements of the slide bars on their supports, the scribing point 8 will move away from the axis O while the bar 6 is being turned. For example, the scribing point may move from the point A to the point B and the fixed ratio between the linear movements of the slide bars will be BC/BD. A line through A and D which is the intersection of the line OB with a circle having radius OA will intersect the line BC at E and $BE=BD$. The line AC is parallel to 2 and BC is equal to the linear movement of the bar 7 with respect to its support 5.

A line through O parallel to AD intersects line BC at F and $BF=BO$.

A line through B and A intersects line OF at G.

The line BC intersects a line through G parallel to 2 at H.

Since line GH is parallel to AC, line GF parallel to AE and triangle AEC is similar to triangle GFH, and, since $BF=BO$ and $BE=BD$, $$\frac{BF}{BH}=\frac{BO}{BH}=\frac{BE}{BC}=\frac{BD}{BC}$$

and $$\frac{BO}{BH}=\frac{BD}{BC}=\frac{BO-BD}{BH-BC}=\frac{DO}{CH}=\frac{BD}{BC}$$

and since BD/BC is a constant and DO is a constant for all angular positions of the scribing point CH is also the same for all positions of the scribing point and the locus of points G for all positions of the scribing point is the fixed straight line GH.

Since the ratio BD/BC is constant for all positions of the scribing point, the ratio BO/BH is also constant, and the curve traced by the scribing point is one in which each point on the curve is at a distance from a fixed point that bears a predetermined fixed ratio to its distance from a fixed straight line. It therefore follows that the curve scribed by the point 8 is a conic section, the eccentricity of which is equal to BO/BH.

As shown in Fig. 12, the ratio BO/BH is less than unity and the curve AB is an ellipse. The line GH is the directrix of the ellipse AB and the point O is one of the foci of the ellipse.

If the bars 6 and 7 be so connected as to have equal linear movements with respect to their supports, a curve AI will be traced which is a parabola having its focus at O and its directrix at KL. If the bars 6 and 7 be so connected that the ratio between the linear movement of the bar 6 and the linear movement of the bar 7 is greater than unity, a curve such as AM will be traced and this curve will be an hyperbola having a focus at O and its directrix at PN.

It will be apparent that the focal length of the curve scribed may be changed by adjusting the initial position of the bar 6 to vary the distance of the scribing point 8 from the pivotal axis.

Since the slide bar 7 has parallel motion, it follows that the same curve will be scribed by all points moving with the bar 7. However, for convenience of adjustment it is desirable that the scribing point 8 be located in the axis of the pivot connecting the bars 6 and 7.

In Fig. 12 the bar 7 is shown perpendicular to the bar 2 and the bar 6 is assumed to be radially disposed with respect to the axis of rotation of its support 4. It can be readily demonstrated, however, that conic section curves are scribed by a point moving with the bar 7 if the slide bar 7 be set at any fixed angle to the bar 2 or if the slide bar 6 be disposed at any fixed distance from the axis of rotation of the support 4, it being essential only that the bars 6 and 7 have no movement other than endwise sliding movement with respect to their supports and that the sliding movements of the two pivotally connected bars be proportional. Changing the angle of the bar 7 with respect to the bar 2 varies the eccentricity of the curve scribed for each setting of the proportional movement mechanism connecting the bars 6 and 7 and in order to obtain this additional adjustment of eccentricity means is provided for adjusting the angular position of the bar 7 with respect to the bar 2. Offset positioning of the bar 6 would not affect the eccentricity of the curve scribed but it is preferred to position the bar 6 radially since the axis of rotation of the support 4 with the bar radially disposed is at a focus of the curve being scribed and the adjustment of the bar 6 for a curve of a predetermined focal length is more easily determined.

The proportional movement mechanism connecting the bars 6 and 7, one to the other and to their supports will now be described.

As best shown in Figs. 5 and 6, the support 4 suspended beneath the bar 1 and has a top plate 10, side plates 11 and 12 and a bottom plate 13 that are preferably detachably connected. The slide bar 6 which is preferably of tubular form and rectangular cross section is slidably mounted in the bottom plate 13, being positioned between the side wall 12 and a flange 14 on the bottom plate 13 and between the bottom plate 13 and a positioning flange 15 on the side plate 12. The support 4 is suspended by means of a pivot pin 16 that extends through an opening in the top plate 10 and that has a flange 17 at its lower end attached to the plate 10 by means of screws 18.

The pivot pin 16 extends upwardly through a bearing collar 19 mounted in an opening in the bar 1 and supported by means of a flange 20 engaging the top face of the bar 1. A hand wheel 21 is attached to the upper end of the pivot pin 16 by means of a screw 22 and bears upon the upper end of the collar 19 to support the pivot and the suspended support 4. The support 4 may be turned by means of the hand wheel 21 which is fixed to the pivot pin 16 and the angular position of the support may be indicated by a dial plate 23 on the bar 1 which may be graduated in degrees, the hand wheel 21 being provided with a pointer 24 which moves over the scale.

The slide bar 6 may be provided with a graduated scale 25 on one side thereof and the side plate 11 may be provided with a window 26 and a pointer 27 overlying the scale 25 to indicate the adjustment of the bar 6 with respect to the support 4.

As shown in Figs. 8 and 9, the support 5 carries a guide member 28 which receives the bar 7 which may be of cylindrical tubular form. The guide member 28 is preferably pivotally mounted upon the support 5 so that its angular position with respect to the guide bar 2 may be adjusted.

The guide member 28 has a centrally disposed pivot boss 29 on the under side thereof, which fits in a circular opening in the support 5. The support 28 also has laterally projecting flanges 30 that slidably engage the top face of the support 5. The flanges 30 are provided with arcuate slots 31 that are concentric with the pivot boss 29 and screws 32 extending through the slots 31 and screwed into the support 5 serve to clamp the guide member 28 in different positions of angular adjustment. To indicate the angular position of the guide member 28, the support 5 may carry an arcuate graduated scale 33 over which a pointer 34 on the guide member 28 is movable.

At the ends thereof, remote from their pivotally connected ends, the bars 6 and 7 carry pulleys 35 and 36 over which an endless cable 37 is trained. This cable, which is preferably formed of wire strands, is guided from one bar to the other at a point closely adjacent the axis of the pivot connecting the bars.

As best shown in Figs. 3 and 4, a pair of guide pulleys 38 and 39 are provided on the bar 6 adjacent its pivoted end, and a pair of guide pulleys 40 and 41 are provided on the bar 7 directly beneath the pulleys 38 and 39. The bars 6 and 7 are connected by a tubular pivot 42 that has a flange 43 at its upper end engageable with the bar 6 and a nut 44 at its lower end that engages the bar 7 to hold the pivot in place. The pulleys 38 and 39 are mounted directly above the tubular pivot and the pulleys 40 and 41 are mounted directly beneath the pivot 42 so that the two runs of the endless cable 37 pass through the tubular pivot from one pair of pulleys to the other.

The cable 37 serves to transmit endwise motion from one of the slide bars to the other and this is accomplished by anchoring one run of the cable to one of the supports and providing an actuating connection between the cable and the other support for imparting a movement to the slide bar on the latter support that is proportional to the endwise movement of the bar on the first mentioned support. As herein shown an actuating connection is provided on the support 4 and this connection includes a drum 45 mounted on the support 4 immediately above the bar 6. The drum 45 is carried by a transverse shaft 46 mounted in the side plates 11 and 12, and as best shown in Fig. 5, the drum 45 has a hub 47 which receives the shaft 46 and which is positioned between spacing washers 48 and 49 interposed between the end of the hub and the side plates 11 and 12. The shaft 46 is held in place by suitable means such as nuts 50 at the ends thereof engaging the exterior faces of the plates 11 and 12.

A gear 51 is keyed to the hub 47 of the drum 45 and meshes with a change gear 52 carried by a shaft 53 attached to the side plate 11, the shaft 53 extending through one of a series of spaced openings 54 provided in the side plate 11. A pinion 55 attached to the gear 52 meshes with a rack 56 fixed to the bar 6. The shaft 53 is detachably held in place by means of a thumb nut 57 so that the change gears 52 and 55 can be readily replaced by other pairs of gears providing a different gear ratio between the drum 45 and the bar 6.

One run of the endless steel cable 37 is wound in a plurality of turns around the drum 45 so that when one run of the cable is anchored to the support 5 a turning movement will be imparted to the drum 45 which is proportional to the linear movement of the slide bar 7, and the drum 45 through the change gearing will impart a linear movement to the slide bar 6 which is proportional to the linear movement of the slide 7.

The cable 37 is anchored to the support 5 by means of eyelets 58 and 59 through which the two runs of the cable pass, the eyelets 58 and 59 being carried by vertical rods 60 and 61 that may be independently adjusted vertically by means of thumb nuts 62 and 63 to draw either run of the cable into clamping engagement with a lug 64 carried by the guide member 28, the lug 64 projecting into the interior of the tubular bar 7 through a longitudinal slot 65 in the top of the bar. By turning one or the other of the thumb nuts 62 and 63, either run of the cable may be anchored to the support 5.

Two clamping devices are provided so that reversely positioned curves having the same focal point may be scribed.

A guide pulley 66 is provided between the pulley 36 and the clamping rods 60 and 61, for the purpose of bringing the two runs of the cable to the same horizontal level beneath the lug 64 and the pulley 36 is preferably spring supported so as to maintain a tension on the cable 37. As shown in Fig. 10, the pulley 36 is mounted in an inclined position on a supporting block 67 that is slidably mounted in an opening in the rear end of the bar 7, the block 67 having a rearwardly extending rod 68 attached thereto and being pressed rearwardly by means of a stiff coil spring 69 interposed between a nut 70 on the end of the rod 68 and a washer 71 engaging the rear end of the bar 7. The spring 69 maintains sufficient tension on the cable to insure positive actuation of the drum 45 and serves to take up any slack due to expansion of the cable or stretch in the cable.

The eccentricity of the curve to be scribed is determined by the gear ratio between the drum 45 and the rack 56 and the focal length of the curve is determined by the initial adjustment of the bar 6 on the support 4. It will be readily apparent that when both runs of the cable 37 are free, both slide bars 6 and 7 are free to move in their supports and the bar 6 may be turned to a position at right angles to the bar 2 and adjusted to move the scribing point toward or away from the pivotal axis. The apex of the curve scribed is always in a line at right angles to the bar 2 and passing through the axis of rotation of the support 4.

In scribing the curve the change gearing is set for the desired eccentricity and the bar 6 is adjusted to the desired focal length of the curve to be scribed, whereupon one of the runs of the cable 37 is anchored to the support 5 by turning the nut 62 or 63, after which the support 4 is turned to cause the point 8 to scribe the desired curve. The effect of changing the angularity of the bar 7 with respect to the guide bar 2 is to increase the eccentricity of the curve for a given setting of the change gears which actuate the slide bar 6. For any angular adjustment of the bar 7, the eccentricity is that provided by the change gears with the bar 7 at right angles to the bar 2, divided by the sine of the angle between the bar 7 and the bar 2. The angular adjustments of the bar 7 enable the instrument to be set to scribe curves of any eccentricity intermediate the eccentricities provided by the change gears so that only a limited number of change gears are required for scribing curves of any eccentricity between wide limits.

For scribing circles the bar 6 may be locked in adjusted position on the support 4 by means of a set screw 72 so that the point 8 will be moved in a circular path of the desired radius when the support 4 is turned about its axis, both eyelets 58 and 59 being positioned to allow free movement of the cable 37.

It is to be understood that variations and modifications of the specific devices herein shown and described for purposes of illustration, may be made without departing from the spirit of the invention.

What I claim is:

1. A conic section scriber comprising a support mounted to turn about a fixed axis, a slide mounted for linear movement on said support, a linearly movable support mounted to travel along a line spaced from said axis, a slide mounted on the linearly movable support for linear movement transverse to said line and pivotally connected to the first mentioned slide, a scribing point movable with said transversely movable slide, motion transmitting means connecting said slides and said supports and controlled by the linear movement of one with respect to its support for maintaining a predetermined fixed ratio between the linear movements of the slides with respect to their supports, and means for adjusting the line of travel of the transversely movable slide angularly with respect to the line of travel of its support.

2. A conic section scriber comprising a support mounted to turn about an axis corresponding to the focal point of the curve to be scribed, a slide mounted for radial movement on said support, a second support mounted for movement parallel to a directrix spaced from said axis, a slide on said second support mounted for movement in a direction transverse to said directrix, means connecting said slides including a pivot for transmitting movement from one to the other, means controlled by the linear movement of one of said slides on its support for maintaining a predetermined fixed ratio between the linear movements of the slides on their supports, means for adjusting said transversely movable slide to vary the angle between the lines of movement of the slide and its support, and a scribing point carried by said transversely movable slide.

3. A conic section scriber comprising a support mounted to turn about an axis corresponding to the focal point of the curve to be scribed, a slide mounted for radial movement on said support, a second support mounted for movement parallel to a directrix spaced from said axis, a slide on said second support mounted for movement in a direction transverse to said directrix, means connecting said slides including a pivot for transmitting movement from one to the other, means controlled by the linear movement of one of said slides on its support for maintaining a predetermined fixed ratio between the linear movements of the slides on their supports, a scribing point carried by the transversely movable slide, means for adjusting one of said slides relative to its support to vary the focal length of the curve to be scribed, and means for adjusting said transversely movable slide angularly with respect to its support to vary the eccentricity of the curve to be scribed.

4. A conic section scriber comprising a support mounted to turn about a fixed axis, a second support mounted to travel along a line spaced from said axis, slides mounted for linear movements on the supports and pivotally connected, means for adjusting one of the slides with respect to its support to vary the focal length of the curve to be scribed, means for adjusting the angularity of the slide on the second support with respect to said line to vary the eccentricity of the curve to be scribed, motion transmitting means for operatively connecting said slides to their supports and to one another to maintain a predetermined fixed ratio between the linear movements of said slides with respect to said supports, and a scribing point moving with the slide on said second support.

5. A conic section scriber comprising a support mounted to turn about a fixed axis, a second support mounted to travel along a line spaced from said axis, slides mounted for linear movements on the supports and pivotally connected, means for adjusting the slide on the first mentioned support to vary the focal length of the curve to be scribed, motion transmitting means for connecting the slides to their supports and to one another for maintaining a predetermined fixed ratio between the linear movements of the slides on their supports, said motion transmitting means including change speed gearing to provide different ratios between said movements of the slides to vary the eccentricity of the curve scribed, and a scribing point moving with the slide on said second support.

6. A conic section scriber comprising a support rotatable about a fixed axis, a support movable along a line spaced from said axis, an endwise slidable bar mounted on the rotatable support, an endwise slidable bar on the linearly movable support, the latter bar being pivoted to the bar on the rotatable support and transversely disposed with respect to said line, cable guides on said bars adjacent the pivot and adjacent their opposite ends, an endless cable extending over said guides, and releasable means for anchoring one run of said cable to one of said supports.

7. A conic section scriber comprising a support rotatable about a fixed axis, a support movable along a line spaced from said axis, an endwise slidable bar mounted on the rotatable support, an endwise slidable bar on the linearly movable support, the latter bar being pivoted to the bar on the rotatable support and transversely disposed with respect to said line, pulleys on said bars adjacent the pivot and adjacent their opposite ends, an endless cable extending over said pulleys, releasable means for anchoring one run of said cable to one of said supports, gearing carried by the other of said supports actuated by said cable, and means operated by said gearing for imparting endwise movement to the bar on the support upon which the gearing is mounted.

8. A conic section scriber comprising a support rotatable about a fixed axis, a support movable along a line spaced from said axis, an endwise slidable bar mounted on the rotatable support, an endwise slidable bar on the linearly movable support, the latter bar being pivoted to the bar on the rotatable support and transversely disposed with respect to said line, pulleys on said bars adjacent the pivot and adjacent their opposite ends, an endless cable extending over said pulleys, releasable means for anchoring one run of said cable to one of said supports, an actuating drum mounted on the other of said supports about which said cable is wound, a rack on the slide carried by the latter support, and a pinion driven by said actuating drum and meshing with said rack.

9. A conic section scriber comprising a support rotatable about a fixed axis, a support movable along a line spaced from said axis, an endwise slidable bar mounted on the rotatable support, an endwise slidable bar on the linearly movable support, the latter bar being pivoted to the bar on the rotatable support and transversely disposed with respect to said line, pulleys on said bars adjacent the pivot and adjacent their opposite ends, an endless cable extending over said pulleys, releasable means for anchoring one run of said cable to one of said supports, an actuating drum mounted on the other of said supports about which said cable is wound, a rack on the slide carried by the latter support, and gears interposed between said actuating drum and rack.

10. A conic section scriber comprising a support rotatable about a fixed axis, a support movable along a line spaced from said axis, an endwise slidable bar mounted on the rotatable support, an endwise slidable bar on the linearly movable support, the latter bar being pivoted to the bar on the rotatable support and transversely disposed with respect to said line, pulleys on said bars adjacent the pivot and adjacent their opposite ends, an endless cable extending over said pulleys, releasable means for anchoring one run of said cable to one of said supports, and means for adjusting the angularity of the bar on the linearly movable support with respect to the line of travel of the support.

11. A conic section scriber comprising a support rotatable about a fixed axis, a support movable along a line spaced from said axis, an endwise movable bar mounted on said rotatable support, an endwise movable bar on the linearly movable support, the latter bar being pivoted to the bar on the rotatable support and being disposed transversely with respect to said line, pulleys on said bars adjacent the pivot and adjacent the opposite ends of said bars, an endless cable passing over said bars, means for releasably anchoring one run of said cable to one of said supports, an actuating connection between the cable and the other of said supports, a scribing point movable with said transversely disposed bar, and means for locking the bar on the rotatable support in various positions of adjustment.

12. A conic section scriber comprising a support rotatable about a fixed axis, a support movable along a line spaced from said axis, two bars pivoted end to end and each mounted for endwise sliding movement on one of said supports, the bar on the rotatable support being radially disposed with respect to the axis about which it turns and the bar on the linearly movable support being disposed transversely with respect to said line, a scribing point movable with the latter bar, pulleys on the bars at the ends remote from the pivot, an endless cable passing over said pulleys, means for guiding said cables from bar to bar adjacent the pivot, and means for releasibly anchoring either run of said cable to the linearly movable support.

13. A conic section scriber comprising a support rotatable about a fixed axis, a support movable along a line spaced from said axis, two bars pivoted end to end and each mounted for endwise sliding movement on one of said supports, the bar on the rotatable support being radially disposed with respect to the axis about which it turns and the bar on the linearly movable support being disposed transversely with respect to said line, a scribing point movable with the latter bar, pulleys on the bars at the ends remote from the pivot, an endless cable passing over said pulleys, means for guiding said cables from bar to bar adjacent the pivot, means for releasably anchoring either run of said cable to the linearly movable support, and means for angularly adjusting the transversely disposed bar with respect to said line.

14. A conic section scriber comprising a frame, a support mounted on said frame to turn about a fixed axis, a linear way on said frame spaced from said axis, a support mounted on said way, a guide member mounted on the latter support for adjustment about an axis parallel with said fixed axis, a radial guideway on the rotatable support, endwise slidable bars in said guide member and guide way and pivotally connected end to end, pulleys on said bars at the ends remote from their pivoted ends, an endless cable running over said pulleys, means adjacent the pivotal connection between said bars for guiding the cable from one bar to the other, means for releasably anchoring either run of said cable to said adjustable guide member, an actuating drum on the rotatable support about which said cable is wound, and change speed gearing interposed between said drum and the radially movable bar for imparting endwise movement to the bar.

15. A conic section scriber comprising a support rotatable about a fixed axis, a member mounted for linear movement on said support and having a scribing point movable therewith, a controlling member mounted for movement parallel to a directrix spaced from said axis, and means operatively connecting said members and said support for imparting a movement to said linearly movable member relative to its support that is proportional to the movement of the scribing point toward or away from said directrix, said movement imparting means including a speed ratio changing device to provide different speed ratios between said movements of said members.

16. A conic section scriber comprising a support rotatable about a fixed axis, a second support mounted for movement along a line spaced from said axis, a linearly movable slide on each of said supports, said slides being pivotally connected and the slide on said second support being movable transversely to the line of travel of said support, a scribing point on one of said slides, and motion transmitting means connecting said second support and its slide to said rotatable support and its slide for imparting a linear movement to the slide on the rotatable support that is proportional to the movement of the scribing point toward or away from said line, said motion transmitting means including a speed ratio changing device to provide different speed ratios between said movements of said members.

17. A conic section scriber comprising a support mounted to turn about a fixed axis, a slide mounted for linear movement on said support, a linearly movable support mounted to travel parallel to a directrix spaced from said axis, a slide mounted on the linearly movable support for linear movement transverse to said directrix and pivotally connected to the first mentioned slide, a scribing point movable with said transversely movable slide, and motion transmitting means connecting said slides and said supports and controlled by the linear movement of one slide with respect to its support for maintaining a predetermined fixed ratio between the linear movements of the slides with respect to their supports, said motion transmitting means including a speed ratio changing device to provide different speed ratios between said movements of said members.

18. A conic section scriber comprising a support mounted to turn about a fixed axis, a second support mounted to travel along a line spaced from said axis, slides mounted for linear movements on the supports and pivotally connected, means for adjusting the slide on the first mentioned support to vary the focal length of the curve to be scribed, motion transmitting means for connecting said slides to their supports and to one another for maintaining a predetermined fixed ratio between the linear movements of the slides on their supports, said motion transmitting means including a speed ratio changing device to provide different speed ratios between said movements of said members to vary the eccentricity of the curve to be scribed, and a scribing point moving with the slide on said second support.

19. A conic section scriber comprising a support rotatable about a fixed axis, a linearly movable support movable along a line spaced from said axis, a member mounted on said rotatable support for movement radially thereon, a member slidable upon said linearly movable support in a direction transverse to the line of travel of the support, motion transmitting means connecting said slidable member and said radially movable member to one another and their supports for imparting movements to said slidable member and its support upon turning movements of said rotatable support and for maintaining a fixed predetermined ratio between the movements of said members with respect to their supports, said motion transmitting means being of the speed ratio changing type to provide different speed ratios between said movements to scribe curves of different eccentricities, a scriber movable with the transversely movable member, and means for adjusting said radially movable member to vary the focal length of the curve scribed by said point.

VERNON H. GRAY.

REFERENCES CITED

The following references are of record in the file of this patent:

FOREIGN PATENTS

| Number | Country | Date |
|--------|---------|------|
| 342,893 | Great Britain | Feb. 12, 1931 |